United States Patent

Pike

[15] 3,670,179

[45] June 13, 1972

[54] ELECTRICAL CIRCUIT

[72] Inventor: Winthrop Seeley Pike, Princeton, N.J.

[73] Assignee: RCA Corporation

[22] Filed: Oct. 22, 1970

[21] Appl. No.: 82,945

[52] U.S. Cl. ..............................307/221, 307/224, 307/288

[51] Int. Cl. ....................................G11c 19/00, H03k 23/08

[58] Field of Search ..........................307/221, 223, 224, 288

[56] References Cited

UNITED STATES PATENTS

| | | | |
|---|---|---|---|
| 3,105,157 | 9/1963 | Norman | 307/221 |
| 3,310,686 | 3/1967 | Valentine | 307/288 X |
| 3,446,973 | 5/1969 | Springer, Jr. | 307/221 X |
| 3,469,110 | 9/1969 | Sherman | 307/223 |

*Primary Examiner*—John Zazworsky
*Attorney*—H. Christoffersen

[57] ABSTRACT

A shift register employing a plurality of complementary flip-flop circuits with noncapacitive interstage coupling.

10 Claims, 7 Drawing Figures

INVENTOR.
Winthrop S. Pike
BY G. Donald Weber Jr.
ATTORNEY

INVENTOR.
Winthrop S. Pike
BY G. Donald Weber
ATTORNEY

INVENTOR.
Winthrop S. Pike
BY
ATTORNEY

ELECTRICAL CIRCUIT

BACKGROUND OF THE INVENTION

There are many applications of scanning devices, such as devices for scanning solid state sensors and the like. For example, a solid state sensor which is scanned may represent a solid state vidicon or the like. In this type of sensor, it is frequently necessary to sequentially pulse a series of row or column bus bars or paths. One of the more efficient methods is to utilize a shift register which is clocked at a constant rate. As a pulse moves along the clocked shift register, a signal is applied to the bus paths of the sensor in sequence. In a large, high resolution sensor, the number of bus paths to be pulsed may be extremely large. Even with specialized decoding or the like, many stages may be required in the shift register. The larger the number of stages required, the more desirable it becomes to minimize the number of components per stage. In addition, as the number of stages increases, it is more desirable to provide a circuit having a low power consumption.

The shift register may be of several types including a "-wavefront" type shift register wherein a single input signal is applied and propagated throughout the register. Conversely, a shift register may be provided wherein a single pulse is propagated through the register with the stages being reset to an initial condition subsequent to the passage of the information signal.

SUMMARY OF THE INVENTION

The circuit used in practicing the invention is of the complementary flip-flop type known in the art. A plurality of the flip-flop circuits described is connected together via suitable coupling means to form a shift register. The coupling means is noncapacitive wherein a static, parallel output register is provided which is useful at any frequency including DC. In the several embodiments disclosed, different means for coupling the basic circuits together, clocking the shift register and supplying inputs to the circuit are provided. The different clocking arrangements or the different coupling arrangements provide different advantages in the operations of the circuit.

DESCRIPTION OF THE PREFERRED EMBODIMENT

Figures 1, 2, 2A:
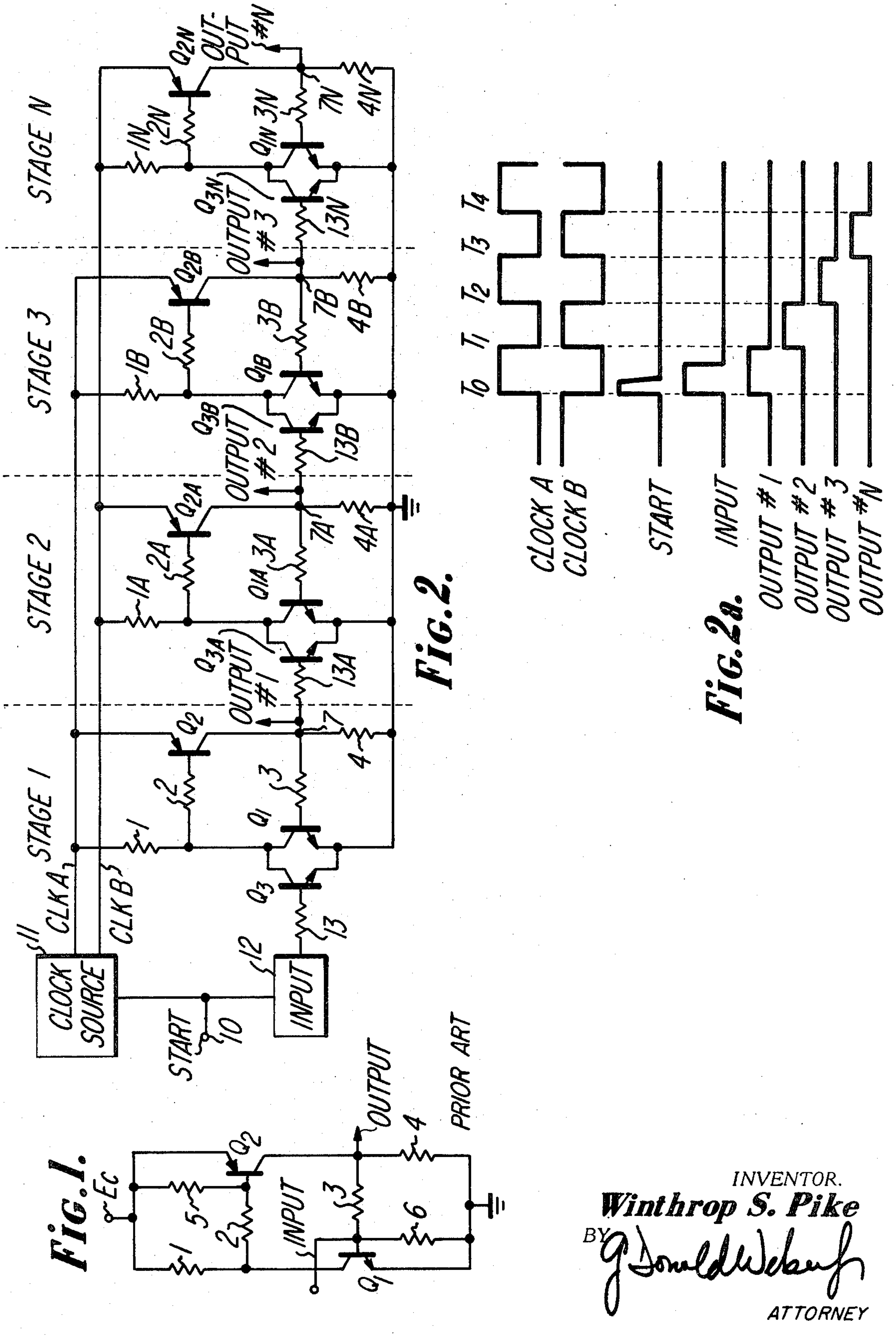
FIG. 1 is a schematic diagram of a flip-flop circuit utilized in the invention.
FIGS. 2, 3 and 4 are schematic diagrams of different embodiments of the instant invention.
FIGS. 2A, 3A and 4A are timing diagrams which relate to the associated schematic circuits described supra.

In the following description, similar functional elements bear similar reference numerals in each of the Figures.

Referring now to FIG. 1, there is shown a schematic diagram of the storage circuit utilized in the shift register. The circuit is generally referred as a complementary bistable flip-flop circuit and is known in the art. The circuit is designated complementary because transistors Q1 and Q2 are opposite conductivity types. The circuit is bistable in that it can assume two different stable states. In the respective stable states, transistors Q1 and Q2 are each conductive or each nonconductive. This type of circuit is sometimes referred to as a flip-flop circuit (see for example U.S. Pat. No. 3,310,686 by L.F. Valentine).

In describing the circuit, transistor Q1 is designated as an NPN type transistor. The emitter of transistor Q1 is connected to circuit ground and the collector of transistor Q1 is connected to a suitable positive potential source $E_C$ via resistor 1. The base of transistor Q1 is connected to ground by the resistor network comprising resistors 3 and 4. In addition, optional resistor 6 is connected between the base of transistor Q1 and ground to increase the speed of the turn-off characteristic of transistor Q1. However, resistor 6 is not required in many applications of the circuit.

The emitter of PNP transistor Q2 is connected to the aforementioned source EC. The collector of PNP transistor Q2 is connected to the common junction of resistors 3 and 4. In addition, the output of the circuit is connected to the collector of transistor Q2. The base of transistor Q2 is connected via resistor 2 to the collector of transistor Q1. In addition, optional speed-up resistor 5 is connected between the base of transistor Q2 and source $E_C$.

In describing the operation of the circuit, assume that transistor Q1 is nonconductive. With no collector current flowing through resistor 1, transistor Q2 then is also nonconductive. That is, lack of conduction by either of transistors Q1 or Q2 effectively removes a current path relative to the other transistor whereby the transistors are each nonconductive.

Upon application of the input signal (which may be applied to either of the transistors Q1 or Q2), the appropriate transistor is rendered conductive. In the illustrative embodiment the input signal is supplied to the base of transistor Q1. Consequently, a relatively positive input signal is applied to the base of transistor Q1 to render transistor Q1 conductive. When transistor Q1 is conductive, a current flows from source $E_C$ to ground via resistor 1 and transistor Q1. The resulting voltage developed across resistor 1 forward-biases transistor Q2 and renders it conductive. When transistor Q2 is rendered conductive, current flows from source $E_C$ to ground through transistor Q2 and resistor 4. The voltage developed across resistor 4 maintains transistor Q1 in a conducting condition. Conduction by transistors Q1 and Q2 tends to latch the circuit wherein operation of each of the transistors is capable of sustaining conduction by the other transistor.

Alternatively, the circuit may be caused to "latch-up" in the state wherein both transistors are conductive by shorting the collector-emitter path of either transistor. For example, the emitter and collector of transistor Q1 (or transistor Q2) may be shorted momentarily by means of a switch or an additional transistor as suggested infra.

If now an input signal of the opposite polarity is supplied, transistor Q1 (or alternatively transistor Q2) is rendered nonconductive thereby interrupting the associated circuit path. When the circuit path is interrupted, voltage and current conditions change whereby the transistor in the other circuit path is also rendered nonconductive and the second stable state occurs. Alternatively, the circuit may be caused to "latch-up" in the state wherein both transistors are nonconductive by momentarily shorting the base-emitter path of transistor Q1 (or transistor Q2) by means of a switch or an additional transistor.

Referring now to FIG. 2, there is shown one embodiment of a shift register which can be provided by utilizing the flip-flop circuit shown in FIG. 1. In this embodiment, four substantially identical stages are shown for illustration. The number of stages is not critical to the invention. The operation of each of the stages is substantially identical.

The START terminal 10, which may be a switch or the like, is connected to clock source 11 and input source 12. This relationship is suggested in order that clock source 11 and input source 12 may be properly synchronized. There are other methods of establishing this synchronism and the particular input control mechanism is not limitative of the invention. Clock source 11 may be any suitable clock source which supplies two output signals designated as clock A (CLK A) and clock B (CLK B). Typically, the clock A and clock B signals may be provided by the complementary outputs of a toggle flip-flop or the like. The clock A and clock B signals are supplied to alternate stages in the shift register. For example, the clock A signal is supplied to stage 1, stage 3 and other odd numbered stages. Conversely, clock B signals are supplied to stage 2 and other even numbered stages through stage N. Thus, in the operation of the circuit, each of the odd numbered stages is energized simultaneously while each of the even numbered stages is energized simultaneously. However, the even and odd stages are energized out of phase. Consequently, it is obvious that at no time it is possible for two adjacent stages to be energized concurrently. This operation permits information to be transferred through the shift register one stage at a time.

In the circuit shown in FIG. 2, it is seen that the clock signals replace the source $E_C$ (of FIG. 1) whereby power is supplied to the individual stages on an intermittent, rather than continuous, basis. Thus, the energization of the stages is controlled.

In FIG. 2, input source 12 is connected by coupling resistor 13 to the base of NPN transistor Q3. The emitter of transistor Q3 is connected to the emitter of transistor Q1, and the combination thereof is connected to ground. The collector of transistor Q3 is connected to the collector of transistor Q1, and the combination thereof is connected to the clock A line via resistor 1. The emitter of PNP transistor Q2 is also connected to the clock A line while the collector of transistor Q2 is connected to ground via resistor 4. Resistors 2 and 3 are connected from the base of transistor Q2 to the collector of transistor Q1 and from the base of transistor Q1 to the collector of transistor Q2, respectively. Thus, it is seen that the configuration of the circuit in stage 1 of FIG. 2 is substantially similar to the circuit shown in FIG. 1 with the addition of the specific input coupling means and the specific application of a power signal at the clock A line.

The output terminal 7 of the circuit in stage 1 is connected to the output 1 terminal and, concurrently, via coupling resistor 13A to the base of input transistor Q3A of stage 2. Again, transistor Q3A is connected across transistor Q1A with the collectors and emitters connected together. The emitters of the transistors are connected to ground while the collectors are connected via resistor 1A to the clock B line. Likewise, the emitter of transistor Q2A is connected to the clock B line while the collector is returned to ground via resistor 4A. Coupling resistors 2A and 3A are connected between the respective base and collector electrodes of transistors Q2A and Q1A. The remainder of the circuit is repetitive of the circuit as described and further description is believed unnecessary. That is, stages 3 through N are identical to stages 1 and 2 in circuit configuration and operation.

In operation, start terminal 10 receives a suitable input signal from a computer, a switch or the like. The start signal causes clock source 11 and input source 12 to be operated. Input source 12 supplies a positive signal via resistor 13 to the base of transistor Q3 to enable transistor Q3. Application of a relatively positive signal by clock A to the collector of transistor Q3 (the emitter thereof is connected to ground) permits current flow through transistor Q3 whereby transistor Q1 is short circuited. Moreover, current flow in this path causes transistor Q2 to be rendered conductive inasmuch as the potential at the base thereof in reduced. Thus, current flows through transistor Q2 and resistor 4 from clock A to ground. This current flow provides a relatively positive potential at the base of transistor Q1 to render this transistor conductive. Thus, the circuit "latches-up" and remains in this stable condition so long as the clock A signal is positive.

As seen in FIG. 2A, prior to the concurrent application of a clock A signal and an input signal, output No. 1 was at its relatively negative level, i.e. ground potential. The concurrent application of the input and the clock A signal causes stage 1 to switch states wherein the output signal at terminal 7 (output No. 1) becomes positive.

As noted, the input signal need be only of sufficient duration to assure that transistor Q2 will be rendered operative so that current capable of sustaining transistor Q1 will be provided. Thus, the input signal must have a minimum duration to effectively switch the stage circuit. A maximum duration of one half of the duration of clock cycle is prescribed in order to avoid overlapping of input signals and clock pulses.

The positive output signal at terminal 7 is supplied via resistor 13A to the base of transistor Q3A. However, until time period T1 the clock B signal is at its low level, e.g. 1 volts, whereby transistor Q3 has essentially no collector current.

At time period T1, the clock A signal switches to a relatively negative level while the clock B signal switches to a relatively positive level. Thus, a relatively positive signal is supplied at the collector of transistors Q3A and Q1A. Because of the inherent delays included in the recombination of charge in transistors Q2 and Q3A, the relatively positive output signal at terminal 7 maintains transistor Q3A in the conductive condition for a sufficient duration to permit transistor Q2A to be rendered conductive in response to the clock B signal. Ultimately, however, transistor Q1 and Q2 are rendered nonconductive by the relatively negative clock A signal supplied thereto whereby the output No. 1 signal becomes a relatively negative signal, e.g. 0 volts.

Since transistors Q2A and Q1A have been rendered conductive by the momentary application of an input signal via transistor Q3A, the output at terminal 7A switches from a relatively negative to a relatively positive level. This signal is detected at the output no. 2 terminal. In addition, this signal is supplied via coupling resistor 13B to the base of transistor Q3B of stage 3. However, the transistors of stage 3 are clamped in the nonconductive condition because of the status of the clock A signal.

At time period T2 the clock A and clock B signals again reverse. Again, because of the inherent delays in the turning off of transistors Q2A and Q3B, and input signal is applied to stage 3 wherein transistors Q2B and Q1B are rendered conductive in the manner described relative to stage 2.

This stage-by-stage operation continues and a signal is propagated along the shift register, ultimately reaching stage N and providing a signal at the output No. N terminal. Thus, it is seen that each of the individual output terminals (which may be connected to sense lines in a solid state sensor or the like) sequentially receives a sense signal. Consequently, a parallel output is provided and faster operation of a sensor is achieved. Since only one stage in the register draws current at any one time, power consumption is held to a low value.

Figure 3:
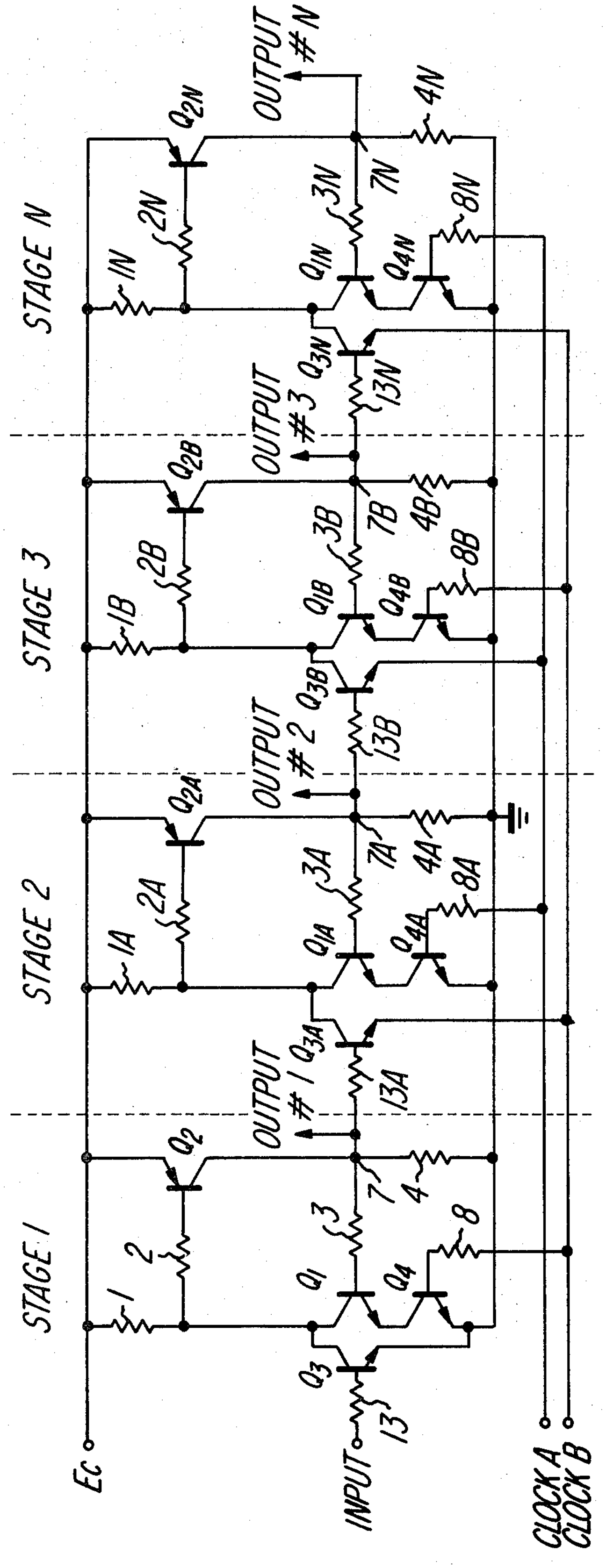

Referring now to FIG. 3, there is shown a schematic diagram of another embodiment of the invention. In this Figure, the details of the input and clock signal sources are omitted for purposes of clarity. Moreover, potential source $E_C$ is connected to provide power continuously to each of the stages. The circuit embodiment has the advantage that the clock signals are not required to supply the drive power to the individual circuits. Rather, the clock signal need supply only sufficient switching power to render the circuits selectively operative while the standard driving power is supplied by source $E_C$.

In the circuit of FIG. 3, an additional NPN transistor is connected in series with the NPN transistor and is referred to as the clocking transistor. Thus, in stage 1 for example, the circuit path between source $E_C$ and ground includes resistor 1, transistor Q1 and clocking transistor Q4 in series. Consequently, each of transistors Q1 and Q4 must be concurrently conductive in order to provide a current path, and, therefore, a sustaining (latched) operation.

The input signal at the input terminal is supplied via resistor 13, to the base of transistor Q3. The collector of transistor Q3 is connected to the collector of transistor Q1 as before. However, the emitter of transistor Q3 is connected to the emitter of NPN transistor Q4. The collector of clocking transistor Q4 is connected to the emitter of transistor Q1 thereby placing the conduction paths of transistors Q1 and Q4 in series. The base or control electrode of transistor Q4 is connected via coupling resistor 8 to one of the clock lines, for example clock B. The remainder of the circuit as shown in stage 1 is similar to that shown in FIG. 1.

Output terminal 7 of stage 1 is connected via coupling resistor 13A to the base of coupling transistor Q3A. The collector electrode of transistor Q3A is connected to the collector of transistor Q1A. The emitter of transistor Q1A is connected to the collector of clocking transistor Q4A while the emitter of transistor Q4A is connected to ground. Thus, transistors Q1A and Q4A are connected in series. However, the emitter of transistor Q3A is connected to clock B line while the base of transistor Q4A is connected via coupling resistor 8A to the clock A line. Again, the remainder of the circuit shown in stage 2A is similar to the circuit shown in FIG. 1.

Output terminal 7A of stage 2 is connected via coupling resistor 13B to the base of coupling transistor Q3B. The circuit configuration of stage 3 is similar to the circuit configuration of stage 2 with the exception that the emitter of transistor Q3B is connected to clock A line while the base of clocking transistor Q4B is connected via coupling resistor 8B to clock B line. The clocking transistor in alternate stages is coupled to the opposite clock line. For example, the clocking transistors of the even numbered stages are connected to the clock A line while the clocking transistors of the odd numbered stages are connected to the clock B line. Moreover, (with the exception of the input stage) the interstage coupling transistor is connected to the same clock line as the clocking transistor in the preceding rather than succeeding, stage relative to the coupling transistor. Consequently, with the exception of the input stage or stage 1, the coupling transistors Q3 and the clocking transistors Q4 in each stage are connected to different clock lines such that these transistors are energized or rendered conductive mutually exclusively.

Figure 3A:
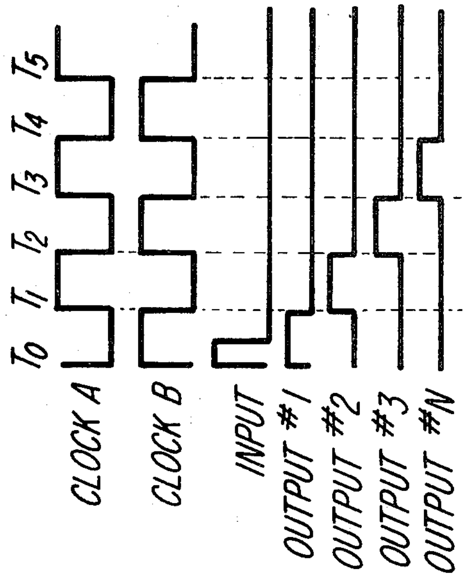

The operation of the circuit shown in FIG. 3 is more easily understood when the timing diagram shown in FIG. 3A is referred to concurrently. As described supra, a relatively positive input signal is supplied via resistor 13 to the base of NPN transistor Q3. Transistor Q3 is, thus, rendered conductive and provides a completion of the current path from source $E_C$ to ground via resistor 1. This current path has the effect of causing transistor Q2 to have a signal supplied at the base thereof which renders transistor Q2 conductive. When transistor Q2 is conductive, the current path from source $E_C$ to ground is provided therethrough in conjunction with resistor 4. When transistor Q2 is conductive, a signal is supplied, via resistor 3, to the base of transistor Q1 which tends to render transistor Q1 forward biased. However, in the absence of a relatively positive clock B signal supplied to the base of transistor Q4, via resistor 8, a complete current path is not provided for transistor Q1 whereby the termination of input signal causes the circuit to revert to the original condition.

However, with the concurrent application of a clock B signal along with an input signal the switching operation occurs. That is, in addition to transistor Q1, transistor Q4 is rendered conductive whereby there is a complete current path including transistors Q1 and Q4 and resistor 1 between source $E_C$ to ground. Consequently, the termination of the input signal has no net effect on the operating condition of the circuit in stage 1 and a relatively positive output signal is present at output terminal 7. This output signal is supplied via coupling resistor 13A to the base of coupling transistor Q3A. Since the clock B signal is relatively positive, transistor Q3A is nonconductive. However, at this time transistor Q3A may also be driven from a reverse bias condition to a condition of essentially zero bias, so that transistor Q3A is near to conduction. Furthermore, since clock A signal is relatively negative signal, transistor Q4 is turned off whereby a complete current path from $E_C$ through ground via transistor Q1A is prevented.

At time T1, the clock A signal switches to a relatively positive level while the clock B signal switches to a relatively negative level. Thus, transistor Q4 is switched to become nonconductive whereby the current path therethrough is interrupted. Consequently, the conduction states of transistors Q1 and Q2 are reversed and these transistors are rendered substantially nonconductive.

Concurrently, the signal at the emitter of transistor Q3A becomes relatively negative with respect to the potential at the base thereof. Again, due to the inherent delays within the structure of transistors Q2 and Q3A, transistor Q3A is forward biased, at least momentarily, so as to provide a current path across transistors Q1A and Q4A. With this current path provided, a signal is supplied to the base of transistor Q2A which renders this transistor conductive. When transistor Q2A is conductive, the signal applied at the base of transistor Q1A is sufficient to forward bias this latter transistor. Since transistor Q4A concurrently receives a forward biasing potential at the base thereof (from clock A), a current path through transistors Q1A and Q4A is established and the circuit shown in stage 2 "latches" even through the input signal supplied to the base of transistor Q3A has terminated. Thus, a relatively positive output signal is present at output terminal 7A. This output signal is supplied via resistor 13B to the base of transistor Q3B and a similar operation occurs in stages 3 through N. A detailed description of that operation is deemed unnecessary.

Figure 4:
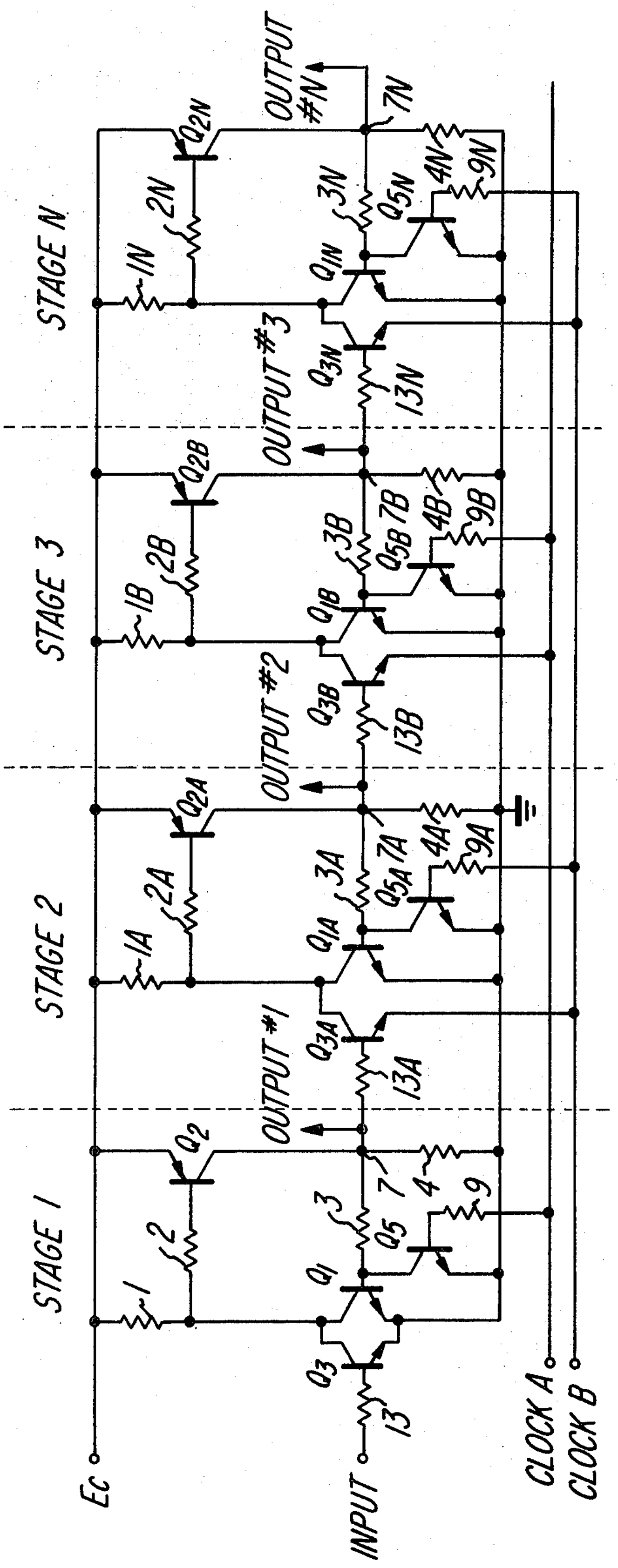
Figure 4A:
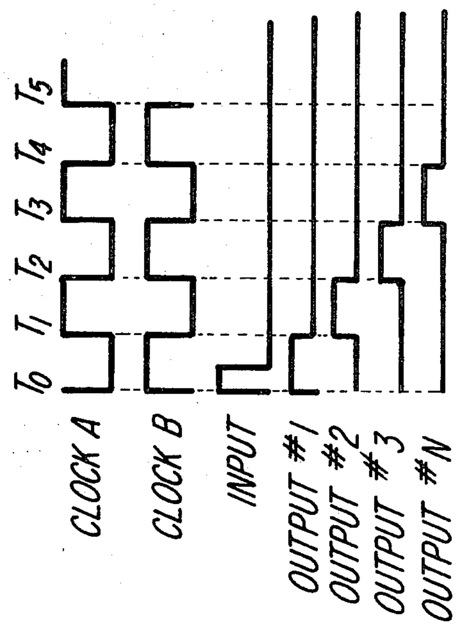

Referring now to FIG. 4, there is shown another embodiment of the invention. The circuit embodiment shown in FIG. 4 is similar to the circuit shown in FIG. 3, in that power supply $E_C$ is connected directly to the circuits in the several stages. Thus, the power drain on the clock is reduced. Moreover, it is seen that the circuit configuration in FIG. 4 resembles the circuit configuration shown in FIG. 2 relative to the coupling of input signals to the circuit and between the stages of the circuit. However, the interstage coupling transistors are connected to, and controlled by, the clock lines. In addition, transistor Q5 is connected between the base of transistor Q1 and ground so that the base of transistor Q1 is selectively short circuited to ground in accordance with the applied clock signals. This circuit configuration has the advantage of accelerating the turn-off of the flip-flop circuit in each of the stages in response to the clock signals. With the exception of the input stage, the coupling transistor and the clocking transistor of each stage are connected to the same clock source line.

At time T0 the input signal is supplied via resistor 13 to the base of transistor Q3. As described supra, the signal causes transistor Q3 to conduct whereby transistor Q2 is rendered conductive and the latch circuit is achieved. Thus, a relatively positive signal is detected at output terminal 7. However, this condition can only exist if transistor Q5 receives a relatively negative signal at the base thereof via resistor 9. This negative signal, supplied by clock A, renders transistor Q5 nonconductive and prevents the short-circuiting of the base-emitter junction of transistor Q1.

Concurrently, a relatively positive clock B signal is supplied to the base of clocking transistor Q5A. Thus, transistor Q5A is rendered conductive and short-circuits the base-emitter junction of transistor Q1A so that transistor Q1A cannot be rendered conductive. The application of the relatively positive signal to the emitter of transistor Q3A concurrent with the relatively positive signal input at the base thereof renders transistor Q3A nonconductive but avoids driving the transistor into hard negative saturation. Thus, transistor Q3A is, effectively, on the threshold of forward conduction.

Consequently at time period T1, when the clock A signal switches relatively positive and the clock B signal switches relatively negative, transistor Q5 is rendered conductive to short-circuit the base-emitter junction of transistor Q1. Thus, the flip-flop circuit of stage 1 is reset whereby a relatively negative signal is present at output terminal 7. However, a noted supra, the inherent delays in the recombination of charges in transistors Q2 and Q3A permits a momentary signal conduction via transistor Q3A which turns on transistor Q2A. Concurrently, transistor Q5A is rendered nonconductive by the clock B signal. Thus, the base-emitter junction of transistor Q1A is not short-circuited. The momentary input signal supplied by transistor Q3A causes the circuit of stage 2 to assume the set condition whereby a relatively positive output signal is detected at output terminal 7A. The output signal is applied to the base of transistor Q3B which transistor is rendered nonconductive by the positive signal supplied by clock A. In addition, the clock A signal is supplied to the base of transistor Q5B whereby this transistor is rendered conductive to short-circuit the base emitter junction of transistor Q1B. The operation of the circuit shown in stages 3 through N is substantially similar to the operation previously discussed and further discussion is deemed unnecessary at this point.

Thus, there is shown and described a plurality of clocked shift registers which utilize complementary bistable flip-flop circuits. These shift registers are capable of conserving power when compared with other shift registers. That is, a shift register of the type described need have only one stage consuming power at any given time. Consequently, a large savings in power is possible with this invention.

In addition, the shift registers described herein require very few components per stage. Moreover, the shift registers described herein use DC coupling and do not utilize or require capacitors or capacitive interstage coupling. This circuit arrangement provides a static, parallel output shift register which is useful at many frequencies including dc.

Furthermore, while the shift registers have been described as using bipolar transistors, it is to be understood that other suitable semiconductor devices may be utilized. The invention also is not meant to be limited to discrete transistors per se. That is, the entire circuit is adapted to be replaced by integrated circuitry and these kinds of elements are intended to be included within this description. Furthermore, it is to be understood that while the specific clocking arrangements have been shown and described, the clocking arrangements may be altered or the phase relationship may be changed as desired. Thus, any changes which fall within the purview of the above description are intended to be included within the embodiments described in the appended claims.

I claim:

1. A shift register comprising; a plurality of circuit stages;
each of said circuit stages including at least first and second semiconductor devices of opposite conductivity type; each of said first and second semiconductor devices having first, second and third electrodes; said first and second electrodes defining a conduction path in said semiconductor devices; said third electrode adapted to control the conduction in said conduction path as a function of the signal applied to said third electrode; said third electrode of each semiconductor device in each circuit stage connected to said second electrode of the other semiconductor device in the same circuit stage so that the conduction in the conduction path of each one of said first and second semiconductor devices of a circuit stage is controlled by the conduction in the conduction path of the other one of said first and second semiconductor devices in the same circuit stage; and a coupling semiconductor device having first, second and third electrodes; said first and second electrodes defining a conduction path in said coupling semiconductor device, said third electrode adapted to control the conduction in said conduction path in said coupling semiconductor device as a function of the signal applied to said third electrode of said coupling semiconductor device; said third electrode of said coupling semiconductor device connected to one of the electrodes defining the conduction path in the second semiconductor device in the same circuit stage; and at least one of said first and second electrodes of said coupling semiconductor device connected to one of the electrodes defining the conduction path in the first semiconductor device of the succeeding circuit stage of said shift register in order to control the conduction in the conduction path of said first semiconductor device in the succeeding circuit stage;
and bipolar drive means for selectively rendering at least one of said plurality of circuit stages operative to receive information transferred thereto.

2. The shift register recited in claim 1 including an output terminal connected to said second semiconductor device in at least one of said circuit stages.

3. The shift register recited in claim 1 wherein said first, second and coupling semiconductor devices comprise transistors, said first and second transistors being of opposite conductivity types, said first and said coupling transistors being of similar conductivity types.

4. The shift register recited in claim 1 including a third semiconductor device in each of said circuit stages having first, second and third electrodes; said third semiconductor device having the conduction path defined by said first and second electrodes thereof connected in series with said conduction path of said first semiconductor device; said third semiconductor device having the third electrode thereof connected to said drive means.

5. The shift register recited in claim 1 including a third semiconductor device in each of said circuit stages having first, second and third electrodes; said third semiconductor device having the conduction path defined by said first and second electrodes thereof connected between the third electrode of said first semiconductor device and one of said first and second electrodes which define the conduction path of said first semiconductor device, said third semiconductor device having the third electrode thereof connected to said drive means whereby conduction by said first and third semiconductor devices is controlled.

6. The shift register recited in claim 5 wherein said coupling semiconductor device has the conduction path thereof connected from said first semiconductor device in the succeeding circuit stage to said drive means such that said coupling semiconductor device effectively shunts said first semiconductor device in accordance with the signals supplied to said coupling semiconductor device by said one stage and by said drive means.

7. The shift register recited in claim 5 wherein said first, third and coupling semiconductor devices comprise transistors of one conductivity type; said drive means includes a source of regularly recurring pulses; the emitter electrode of said coupling transistor and the base electrode of said third transistor are connected to said source so that said third and coupling transistors of each stage are in opposite conductivity states in response to a pulse from said source.

8. The shift register recited in claim 4 wherein said first, third and coupling semiconductor devices comprise transistors of one conductivity type; said drive means includes a source of regularly recurring pulses; the emitter of said coupling transistor connected to said source to receive pulses of one phase; the base of said third transistor connected to said source to receive pulses of a different phase so that said third and coupling transistors are concurrently enabled for conduction.

9. The shift register recited in claim 1 including power source means, said power source means connected to each of said circuit stages to provide power thereto, said power source operating at a different frequency relative to said drive means.

10. The shift register recited in claim 1 wherein said plurality of circuit stages includes odd numbered circuit stages and even numbered circuit stages,
said bipolar drive means supplying signals for selectively rendering said odd numbered circuit stages operative and said even numbered circuit stages inoperative and vice versa.

* * * * *